Patented July 17, 1951

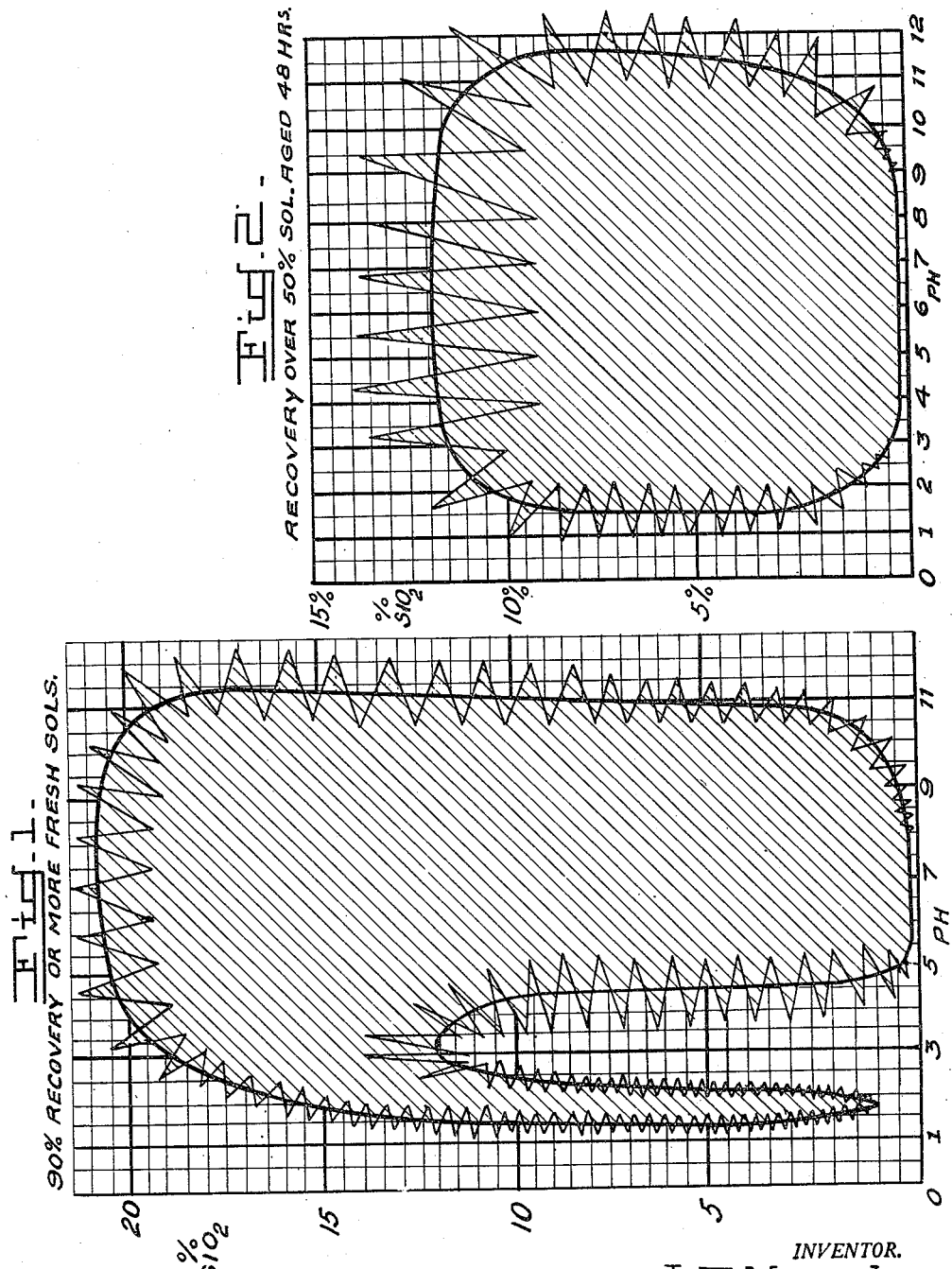

2,561,304

UNITED STATES PATENT OFFICE 2,561,304

PROCESS FOR THE PRODUCTION OF FINELY DIVIDED AMORPHOUS SILICA

James Frederic Hazel, Havertown, Pa., assignor to Philadelphia Quartz Company, Philadelphia, Pa., a corporation of Pennsylvania Application October 30, 1947, Serial No. 783,131

9 Claims. (Cl. 23—182)

This invention relates to manufacture of finely divided silica; and it comprises a process of producing an amorphous precipitated silica, in which the pH of a commercial solution of an alkali metal silicate, containing from about 5 P. P. M. to 30 per cent of $SiO_2$, is altered, usually by the addition of an electrolyte or by electrolysis or by contact with a hydrogen exchange material, to produce a silica sol, freezing the said sol before gelation occurs and within a time period of not substantially over one hour and preferably within about ten minutes after freezing begins, melting and recovering the resulting finely divided precipitate of silica. The invention also includes the precipitated silica produced as a result of the described process, said silica when freshly precipitated having a particle size ranging from about 2 to 15 microns in largest dimensions, said particles usually being in the form of thin transparent flakes of a generally rectangular shape having straight tapering edges, said flakes when viewed by the electron microscope appearing as aggregates of particles having dimensions from about 0.002 to 0.005 microns, said flakes having a refractive index within the range of about 1.43 to 1.47, being soft and readily friable, having a bulk density ranging from about 3.5 to 11 pounds per cubic foot, having an adsorptivity for petroleum ether ranging from about 2.5 to 6 grams per gram of $SiO_2$, and having a water content when air dried ranging from about 8 to 25 per cent by weight; all as more fully hereinafter set forth and as claimed.

This is a continuation-in-part of my copending application, Serial Number 748,639, filed on May 16, 1947, now abandoned. In this prior application I have described and claimed a process of producing an amorphous precipitated silica suitable for use in the rubber, paint, ink, and other industries and I have also described the new form of amorphous precipitated silica so produced. In the present application a critical limit for the time during which freezing occurs is set out since it has been found that this is essential in the production of the finely divided soft form of silica which is described and claimed in said prior application.

For many years a search has been in progress for economical methods of producing silica having particles of microscopic size which could be used as pigments, fillers, adsorbents and the like. Such products are useful when added as fillers to paints, varnishes, printing inks, cosmetics, rubber, plastics etc. and when used as catalysts and as adsorbents for gases etc. Numerous methods have been proposed in the art for producing finely divided silica suitable for such purposes and a few of these processes have met with commercial success, even though expensive.

I have discovered that finely divided precipitated silica can be obtained by a relatively simple and inexpensive method which involves the steps of reducing the pH of solutions of sodium silicate into a region between about 11 and 1 and thus forming a metastable sol which tends to set on standing, heating or evaporation, freezing the resulting silicon dioxide sol before gelation can occur and within a period of about one hour and preferably within ten minutes after freezing starts, thawing and collecting the resulting finely divided precipitate of silicon dioxide. The $SiO_2$ product obtained as a result of this process is substantially pure hydrated silica composed of particles which are usually in the form of transparent flakes having sharply defined edges and readily friable, having a low bulk density and a surprisingly high adsorption coefficient. Its highly favorable properties make the product valuable for a large number of commercial uses and are sufficiently distinct from the properties of known silica products to characterize it as a novel composition of matter. I have found that this product can be produced either by a continuous or a batch method, both of which are commercially feasible.

A few investigators in the prior art have reported the irreversible freezing of silica sols. Lottermoser and his coworkers, for example, produced relatively pure silica sols, usually by the hydrolysis of silicon tetrachloride, and then further purified the resulting sols by dialysis. The thus purified sols, which contained only about 0.7 per cent silica, were then frozen. In the articles reporting the results of these tests it is taught that the sols must be purified by dialysis before irreversible freezing can occur. This, if true, would render any method making use of Lottermoser's procedure commercially unattractive since all known methods of removing electrolytes by dialysis from silica sols are expensive, involve a loss of silica amounting up to 50 per cent, and can be applied only with difficulty to sols as concentrated as 2 per cent $SiO_2$. And, of course, it is obvious that the production of the original sols by the hydrolysis of silicon tetrachloride would involve prohibitive costs.

Others have prepared finely divided $SiO_2$ by peptization of silica followed by freezing, addition of alcohol or dialysis. The particles obtained in this manner are relatively large and have the properties of their source.

The articles written by Lottermoser and coworkers contain incomplete descriptions of the specific procedures utilized by them so it is impossible accurately to reproduce their experiments. I have repeated their tests as accurately as possible, however, and have found, surprisingly enough, that the precipitated silica obtained by freezing dilute, dialyzed silica sols possesses quite different characteristics from the products obtained by my new method. My new products, for example, have relative porosities or fractional void spaces (as determined by the method of Pechukas and Gage, Ind. Eng. Chem. Analytical Chem., 18 (6), 370 (1946) which are from about 50 to 65 per cent greater than that of products obtained by the Lottermoser method, and surface areas which are from about 50 to 300 per cent greater. The refractive index of the Lottermoser products is in the neighborhood of about 1.41 to 1.42 while the minimum refractive index of the products produced by our process is about 1.43. In addition it has been found that the present product has an adsorptivity for dyes, for example, which is substantially greater than that of Lottermoser's product. In one case, a dialyzed sol product showed no absorption of methylene blue whereas the present product had an absorption equivalent to 60 square meters per gram of $SiO_2$. The greater porosities and surface areas of my products are obviously of great advantage in most technical uses, while the higher refractive indices of my products enable their use as fillers in polyvinyl acetal and cellulose acetate plastics to produce transparent molded articles whereas Lottermoser's product would produce at best translucent articles when used in the same manner.

The cause or causes for the differences between my products and those produced by Lottermoser's method are not understood. Several theories could be advanced in explanation but none of these seems to fit all the known facts. In my method electrolytes resulting from the modification of the pH in the first step of my process are present during the freezing step whereas electrolytes are practically eliminated by the dialysis step employed by Lottermoser. It is also true that the latter operation undoubtedly eliminates a large proportion of the more finely divided miscelles of silica, since I have found (supra) that an important loss of silica occurs during dialysis. A further difference is that my silica sols are usually more concentrated than those employed by Lottermoser. I have found, for example, that best results for many uses are obtained when the silica sols employed have an $SiO_2$ concentration not substantially below about 2 per cent by weight. And it is also probable that Lottermoser's sols had pH values below my preferred range of about 4.5 to 10 and were frozen more slowly.

When a silica sol is frozen in the presence of electrolytes there will be a concentration of electrolyte in the vicinity of the sol particles or micelles and this would have a definite effect on the rate of freezing as well as on the product produced. The electrolyte may be forced into the structures of the micelles during freezing and it would doubtless tend to remove water from the solvate layer of the silica while tending to hold the particles apart owing to the hydration of the ions. These effects may partly explain the increased porosity of my product but, from my prior experience with silica gels, I would have predicted that the more concentrated silica sols would have produced a more dense and hence less porous product. The increased concentration of salt would also be expected to hasten gelation with the resulting formation of a dense hard product. It might also have been expected that my sols, which evidently contain micelles ranging in size from substantially molecular dimensions to a size tending to produce or normally causing gelation, would produce a precipitated product more dense than Lottermoser's sols which contain micelles of more uniform and presumably larger size. My tests, however, show that the opposite is the case.

During the experiments which led up to the present invention I discovered several phenomena which have not been previously reported in the literature. In the first place I have found that the rate of freezing is an important factor in the control of particle size, hardness, and other characteristics of the silica product. For example, if the congelation of my silica sols takes place over too long a time period, such as over an hour, gelation is usually induced with the resulting formation of a dense hard product. The particles obtained are relatively large, coarse and "sandy." In contrast to other organic and inorganic colloids, the modified silica sols of my invention can be frozen irreversibly even at $-190°$ C. and with substantially instantaneous freezing. These findings show that the freezing period to be employed, for the production of the soft, highly adsorptive product of the present invention, is critical, extending from an approximately instantaneous action to a maximum of about an hour. The very best products are obtained with a freezing period of not substantially over ten minutes and not substantially over one minute at the higher concentrations.

While no proof is available to show why the freezing time is critical, as stated above, a reasonable explanation appears to be that, if the freezing period is too slow the $SiO_2$ particles not only agglomerate but these agglomerates have sufficient time to segregate in pockets of high salt concentration due to the formation of ice crystals, this resulting in the formation of relatively large "sandy" particles.

Another unexpected phenomenon discovered is that there is a region in the neighborhood of a pH value of 3 within which it is difficult to obtain irreversible freezing of freshly prepared dilute silica sols. In otherwords, silica sols, which have been prepared by acidifying commercial silicate solutions until they become metastable and tend to gel, tend to be stable in the region of pH 3. But I have discovered that this region of stability decreases in extent as the concentration of the silica sols increases. In the neighborhood of this region of stability I have found some evidence that the stability of the silica sols depends upon the particular acid used in reducing the pH. In fact it appears that the acids used can be arranged in what might be called a lyotropic series of increasing stabilizing power. The following acids, for example, can be arranged in the series: sulfuric acid, hydrochloric acid, hydrogen iodide and phosphoric acid. Hydrogen exchange resins produce an effect which is between sulfuric and hydrochloric acids in this list. Presumably this phenomenon is due to the anions of the acids and may involve a dehydrating effect which tends to reduce stability, as well as a stabilizing effect produced by the anions. In the case of sulfuric acid the dehydrating effect seems to predominate over the stabilizing effect.

A still more unexpected phenomenon is that in the neighborhood of this region the temperature at which the sol is frozen or held may determine whether separation occurs. In other words, I have observed that there may be a region of freezing temperatures above and below which the silica does not separate. If the sol is frozen outside this separating range and then transferred to a temperature within this range, the silica will separate no matter how the temperature is altered subsequently. This phenomenon appears to depend on the concentration and pH of the sol and the effect of the modifying anion on the mobility and dehydration of the silica micelles.

A more important phenomenon which I have discovered is that, if the silica sol is aged for a time before it is frozen, this eliminates or at least reduces the tendency of the precipitate formed upon thawing to redisperse. In other words aging tends to make the freezing irreversible. I do not attempt to explain this surprising phenomenon.

By the term "aging," as used in the preceding paragraph, I mean extending the time between the alteration of the pH of the commercial silicate solution and the final thawing operation, which seems to be the important factor.

The conditions which must be observed in order to procure my product from commercial silicate solutions can be explained most easily by reference to the accompanying drawing. The shaded areas on the two figures of this drawing represent metastable areas within which silica sols having the concentrations and pH values indicated can be frozen irreversibly with the production of my precipitated silica product.

In the two figures the concentrations of $SiO_2$ are indicated along the axis of ordinates and the corresponding pH values are represented as abscissas. Fig. 1 represents the conditions obtaining when a silica sol freshly prepared by base exchange is introduced into a tube having a diameter of 20 mm. and exposed to a freezing bath at a temperature of $-10°$ C. for a period of about fifteen minutes, thereafter being thawed. Under these conditions freezing starts in about two minutes and the solution is completely frozen in one or two minutes thereafter and reaches $-10°$ C. in about twelve minutes. As indicated on the plot, 90 per cent or more recovery of the $SiO_2$ present in the silica sol can usually be obtained within the region which is shaded. The zig-zag lines around most of the shaded area indicate that the boundaries of this area may vary with various factors within about the limits indicated by the zig-zags. There are many factors which may affect the boundary of the operative area, among which are the unavoidable aging of the silica sol, aging of the commercial silicate solution subsequent to dilution thereof, the manner of altering the pH of the commercial silicate solution, the rate and degree of freezing which is related to the volume of the mass which is frozen, the quantity and nature of the electrolytes present, the ratio of alkali metal to $SiO_2$ present in the original silicate solution, etc. There are so many of these factors that a more accurate indication of the operative field cannot be given. In my tests I have found that in many cases it is difficult to obtain reproducible results owing to the influence of some undisclosed factor or factors which may affect the size of the ice crystals formed or the like.

It will be noted from a study of Fig. 1 that my precipitated silica products can be obtained by the freezing of silica sols having pH values of from about 4.5 to 10 throughout a range of $SiO_2$ concentrations varying all the way from substantially 0 (about 5 parts per million) to 20 per cent or more. I have found that best results are obtained within this particular region. It is evident from the figure that at pH values below about 4.5 it becomes impossible to obtain irreversible freezing in the case of freshly prepared silica sols of low concentration. If the concentration is increased to about 10 to 12 per cent, however, it is usually possible to obtain my products. Within a narrow region close to a pH of 3 it is quite difficult to obtain irreversible freezing and the results obtained are extremely sensitive with respect to aging and other factors, so the position of the curve within this pH region is rather uncertain. At still lower pH values, that is, within a narrow range of pH in the neighborhood of 1.5 it is possible once more to obtain irreversible freezing at relatively low concentrations of $SiO_2$. The upper boundary of the operative region of somewhat uncertain owing to the fact that it is difficult to alter the pH within this region without causing prompt gelation. It is also difficult to work in the region of pH 7 where gelation is very rapid. However, if the commercial silicate solution employed is chilled substantially to its freezing point, quickly treated to alter its pH and immediately frozen, it is usually possible to operate with silica sols having concentrations of up to about 30 per cent $SiO_2$. The proper selection of reagent may also prolong the sol life. For instance sols formed with HCl have a longer working life than those formed with $H_2SO_4$.

Fig. 2 is a showing similar to that of Fig. 1 but represents the conditions obtaining when a commercial silicate solution is treated to alter its pH to bring it within a metastable region and the resulting silica sol is then aged for a period of forty-eight hours prior to freezing. From a comparison of this figure with that of Fig. 1, it is evident that the aging period substantially eliminates the difficulties involved in obtaining the irreversible freezing of dilute silica sols in the neighborhood of a pH of 3. The upward loop shown in Fig. 1 at this point has entirely disappeared. It is evident that irreversible freezing can be obtained within the pH of from about 3.0 to 10.0 at $SiO_2$ concentrations ranging from almost 0 (about 5 parts per million) to approximately 10 per cent by weight. It is usually impossible to operate at higher concentrations owing to gelation of the silica sols during the forty-eight hours aging period. But at $SiO_2$ concentrations of about 2 to 10 per cent the operative pH range extends from about 1 to 12.

For shorter aging periods the regions within which irreversible freezing can be obtained are intermediate between those indicated in Figs. 1 and 2. For aging periods more extended than forty-eight hours the conditions are quite similar to those indicated in Fig. 2 except that the width of the operative region is extended slightly and the maximum permissible concentration is reduced somewhat. These variations are usually within the zig-zag lines indicated in this figure. As indicated above, the operations of repeated freezing, freezing at temperatures within a preferred range and holding the product in frozen condition over an extended period produce much the same aging effect as merely letting the metastable silica sol stand.

It should be noted that irreversible freezing occurs only in solutions in which the ratio of $SiO_2$ to the alkali metal oxide free to combine therewith is at least about 5:1. The alkali metal oxide in this ratio can be calculated by subtracting from the total alkali metal oxide present any which may be present in the form of salts of acids other than silicic acid. Thus the alkali metal oxide combined with the $SiO_2$ can be reduced either by the addition of acids or by the replacement of alkali metal ions by hydrogen ions, as occurs when a silicate solution is contacted with a hydrogen zeolite, for example.

When an electrolyte is employed to alter the pH to a point within the operative region, the operation of producing the new silica product is extremely simple. Most commercial silicate solutions are advantageously diluted to bring them within the desired concentration range and it is also necessary to add some type of acid material to change the pH. Any materials more acidic than sodium silicate or capable of reducing the pH of a sodium silicate solution can be employed, such as mineral and organic acids, acid salts, salts of strong acids and weak bases, acidic gases, etc. Examples are hydrochloric and sulfuric acids, $CO_2$, $Cl_2$, $NaHCO_3$, $NaHSO_4$, $(NH_4)_2SO_4$, etc.

As indicated above it is also possible to alter the pH of commercial silicate solutions to bring them within the operative region by contacting them with a base exchanging material which is operating in the hydrogen cycle, i. e. the so-called hydrogen zeolites. A number of these compounds are on the market and any of these which are resistant to dilute silicate solutions are operative in the present process. Examples are the carbonaceous zeolite known as Zeokarb and the organic base exchange resins known as Amberlite IR-100H and Nalcite MX. In operation these zeolites exchange hydrogen ions for the alkali metal ions in the silicate solutions and the pH is reduced correspondingly.

The silicate solution is advantageously diluted before being treated with the hydrogen zeolite. It is then passed through a bed of the zeolite in conventional manner and, when the zeolite becomes exhausted, it becomes necessary to regenerate it using an acid, such as hydrochloric or sulfuric acid, which is also done in conventional manner. The regenerated zeolite is then washed to remove excess acid and again used to produce the desired modification of the diluted silicate solution. Surprisingly it has been found that the silicate solutions whose pH have been adjusted by contact with a hydrogen zeolite produce silica products which are more lustrous, silkier and plate-like in microstructure than those modified by the addition of acid substances. The former product is also easier to separate from the liquid by filtration. The reasons for these results are not known.

Another method for the reduction of the pH of sodium silicate solution is by the use of electrolytic cells with or without a diaphragm. Use can be made of the Castner-Kellner mercury cells, for example, which transport ionic sodium away from the silicate solution without loss of $SiO_2$ such as is caused in the dialysis method of Lottermoser, for example.

When desired the concentration of $SiO_2$ may be increased after modification, that is, after reduction of its pH, by well known methods such as evaporation.

After the silicate solutions are treated to lower their pH values and bring their concentrations within an operative region, as indicated in the drawing, it is sometimes desirable to age the modified solution at least for a short time in order to increase the recovery of the desired product. If the pH value and concentration of the modified silicate solution are close to one of the boundary lines of the operative region indicated in Fig. 1 of the drawing, aging to about the point of incipient gel formation may increase the recovery of the $SiO_2$ product to a considerable extent. If the silicate has been modified to a point at which conditions are most favorable for the complete precipitation of the desired product, aging is of no particular benefit and the silica sol produced by the modifying step can be frozen immediately.

In the freezing step of the present process any of the methods and machines used in the rapid commercial production of ice can be employed. Either a batch method or a continuous freezing process can be used. In the batch method the commercial silicate solution to be used can be diluted and modified in a tank. Aging, if employed, can also be conducted by allowing the modified solution to stand in the tank. The modified solution can then be frozen by the so-called plate method or the can system. The resulting blocks can then be broken or ground up and thawed by any convenient method. If desired the frozen mass can be partly or completely thawed by the wash water used to wash the silica product.

It has been found that the use of low freezing temperatures, due to the aging effect produced, sometimes results in a higher recovery of the desired product, especially in the case of pH modified solutions whose compositions and pH values lie close to the boundaries of the shaded areas indicated in the drawing. In some cases a freezing temperature only a fraction of a degree below the congelation point of the liquid produces a maximum recovery of $SiO_2$ while in other cases it has been found that a temperature of 10 or more degrees below the congelation point is desirable.

One very effective method is the use of an inert liquid such as kerosene, cooled to about $-10°$ to $-30°$ C. for example by the use of Dry Ice or other medium. The modified solution may then be added, as in a thin stream, to the freezing bath and the frozen product recovered by decantation.

In the continuous freezing method use may be made of the so-called Flakice machine or the Pak-ice machine or it is possible to employ a rotary drum of the general type used in flaking soap and other materials. The trough of such a flaking machine is kept filled with the modified silicate solution while the drum is chilled and the frozen material is removed by flaking knives and conveyed to a continuous washing and thawing tank in which the frozen material is thawed by the wash water and the $SiO_2$ precipitate washed simultaneously. Sufficient agitation should be provided in the washing and thawing tank to keep the $SiO_2$ in suspension and this suspension can then be drawn off continuously and filtered by means of a rotary continuous filter, for example. Additional washing can be accomplished on the filter, if desired. The product is then ready to be dried which can also be done by conventional methods. Infra red lamps or a rotary drying drum can be employed. Drying temperatures up to about 900° C. can be employed without producing appreciable sintering of the product.

It has been found that the pH of the modified solution which is frozen in the present process has a considerable effect upon the properties of the $SiO_2$ product recovered. For example, when frozen at pH values within the alkaline region, microscopic flakes are formed which seem softer and which frequently appear to have a honeycomb structure. When frozen in the acid range the appearance under the microscope is more likely to be that of layers (lamella) or of a laminated structure. In both cases the product is sufficiently dense to be readily separated from the mother liquor either by decantation methods or filtering. There is no tendency to form mushy or gelatinous precipitates characteristic of silica gels which always cause much difficulty in filtering.

The product recovered in the process of this invention, when carefully washed and dried at elevated temperatures to remove water has an analysis corresponding almost exactly to $SiO_2$, no more than traces of impurities being present. When air dried it has a water content of from about 8 to 25 per cent by weight. One sample prepared at pH 6.9 and washed briefly showed on analysis 12.9% $H_2O$ and 85.7% $SiO_2$. Another prepared at pH 2.4 showed 20.7% $H_2O$ and 79.0% $SiO_2$. The product is amorphous, as indicated by X-ray analysis. Under the petrographic microscope the particles of the product are in the nature of transparent flakes of generally rectangular shape having a particle size ranging from 2 to 15 microns with clearly defined straight edges which are soft and readily broken into similar smaller pieces. When viewed by the electron microscope the flakes are seen to have tapering edges and to be composed of aggregates of particles having dimensions of from about 0.002 to 0.005 micron. The bulk density of the product ranges from about 3.5 to 11 pounds per cubic foot, depending upon the amount of tamping employed. The refractive index varies within the range of about 1.43 to 1.47. The relative porosity or fractional void space, as determined by the resistance to the passage of air through a column of the powder is from about 0.60 to 0.80, and the surface area$\times 10^{-4}$ ranges from about 0.2 to 3.5 square centimeters per gram, as determined by the method of Pechukas and Gage, supra. The adsorptivity, as measured by the ASTM test in ASTM Standards, 1944, part II, p. 888, is approximately 2.5–6 grams per gram of $SiO_2$, using petroleum ether as the adsorption liquid and 2.2–3.0 grams per gram of $SiO_2$, using kerosene as the adsorption liquid. The hardness, as determined by rubbing 0.1 gram of $SiO_2$ between two zinc plates for one minute, was found to vary from about 0.03 to 0.05 gram zinc per gram of $SiO_2$. The particles of the new product have no tendency to become gelatinous when wet with water and hence are easy to filter.

The present invention can be described more accurately by reference to the following specific examples which represent practical embodiments of processes which are capable of producing the described novel product.

*Example 1*

A commercial sodium silicate solution, known as "N," sold by the Philadelphia Quartz Company containing 28.7% $SiO_2$ and having a weight per cent ratio of $Na_2O$ to $SiO_2$ of 1:3.22, was diluted four fold with water to give a concentration of about 9% $SiO_2$. This diluted silicate solution was passed through a column of fresh organic base exchange resin known as "Amberlite IR–100H." The pH, determined colorimetrically with parazo orange, was 12.4. This value is somewhat higher than would be obtained with a hydrogen electrode. The modified silicate solution was then frozen in five minutes at $-10°$ C. and held there for about fifteen minutes and thawed without noticeable redispersion. The product looked gritty but was soft to the touch, although not as silky and the plate-like structure was not as pronounced when viewed with a microscope as in the case of other products produced at lower concentrations and lower pH values, as described below.

*Example 2*

The same sodium silicate solution was diluted 32 fold and cooled to between 4° and 8° C. It was then mixed with sufficient 1 N. $H_2SO_4$, cooled to the same temperature, to give a pH of 8.8 with a glass electrode. The modified silicate solution contained about 1.1% $SiO_2$ and was frozen within ten minutes and held for about fifteen minutes at $-10°$ C. After thawing and washing thoroughly the product was dried at room temperature. This product was smoother and softer and had smaller aggregates than others formed at the same pH but at considerably higher concentrations, or at the same concentration but considerably higher or lower pH. This does not mean that a pH of 8.8 is optimum for all purposes however. A sample prepared the same way, using a modified solution containing 2.2% $SiO_2$, was found to remove a dye, crystal violet, from water solution much faster than powdered or lump silica gel and it also settled more rapidly. Its bulk density was 0.17 gram per cc. when packed closely.

*Example 3*

Again the same sodium silicate solution was diluted 16 fold with water and agitated with a carbonaceous zeolite known as Zeokarb and sold by the Permutit Company. The product was then frozen within five minutes at $-10°$ C. In this case the modified solution contained about 2.3% $SiO_2$ and had a pH of 1.4. After fifteen minutes in the frozen state, it completely dispersed on thawing, but if held (aged) for thirty minutes at $-10°$ C. the silica separated substantially completely.

*Example 4*

Another sodium silicate solution containing 2% $SiO_2$ was aged twenty-four hours, after modification by addition of $H_2SO_4$ sufficient to produce a pH of 3.2, which is close to the region of high stability. When thawed after freezing, only about 50 per cent of the $SiO_2$ present remained undissolved. However, when the modified solution was aged forty-eight hours substantially all the $SiO_2$ remained as a precipitate.

*Example 5*

An "N" sodium silicate solution was diluted 16 fold and treated with Amberlite IR–100H as in Example 1 to produce a modified solution containing 2.3% $SiO_2$ and having a pH of 8.5. This solution was frozen at about $-4°$ to $-10°$ C. within about five minutes. The product after thawing was very soft and appeared as a crinkled film when viewed with a microscope. The surface area was measured by the nitrogen absorption method and found to be 133 acres per kilogram. or $54 \times 10^5$ cm.$^2$/gm.

*Example 6*

A modified silicate solution prepared with the "Amberlite" resin mentioned above, having a concentration of 2.3% SiO$_2$ and pH of 9.3 was frozen at —4 to —5° C. within ten minutes and for about fifteen minutes. Upon thawing all but about 10 per cent of the SiO$_2$ was recovered as a precipitate. This product was then air dried for twenty-four hours and was dry to the touch. When dried further at 125° it lost about 9.5 per cent water. However, when dried at about 800 to 900° C. it lost an additional 8.3 per cent in weight showing that the total water content after air drying is about 17.8 per cent. The product was soft and fluffy after drying under either condition at 125° or 850° C.

*Example 7*

A modified silicate solution containing 2.5% SiO$_2$ and at a pH of 3.15 was prepared by the use of the Amberlite resin described in Example 1. When this solution was frozen, less than one hour after modification, redispersion was complete. However, when it had been allowed to age seventy-two hours, there was no redispersion on thawing. Similarly, when the previously thawed solution was refrozen again after seventy-two hours there was no redispersion. In this latter case, the precipitate was fine and lustrous according to visual examination and was much better formed than in the case of the single cycle at seventy-two hours. These experiments show that a freezing which is "reversible" can be converted into an irreversible freezing merely by aging.

*Example 8*

In this example a peculiar phenomenon was observed in relation to the effect of a standing period between the dilution of a commercial silicate solution and its modification. A stock solution was prepared by diluting an "N" sodium silicate 16 fold to produce a concentration of about 2.5 per cent silica. If this solution was promptly modified with Amberlite IR–100H to give a pH of 3.6 and then frozen for fifteen minutes at —10° C. a nearly complete precipitation of SiO$_2$ was obtained upon thawing. If the diluted solution was permitted to stand for a period of twenty-four hours before modification and then frozen and thawed, a similar result was obtained. But if a standing period of only four hours was employed between dilution and modification, no precipitation of SiO$_2$ was obtained after a fifteen minute freezing period at —10° C. On the other hand if the latter solution was held in frozen condition (aged) for a total period of thirty instead of fifteen minutes, nearly complete separation of SiO$_2$ was obtained upon thawing.

*Example 9*

In this example another phenomenon difficult to explain was observed. In several tests 1 ml. samples of a sol containing 2.5% SiO$_2$ at a pH of 2.2 and formed by modifying "N" silicate of soda with 1N H$_2$SO$_4$, were poured into test tubes immersed in and at the temperature of liquid air, i. e. at approximately —190° C. These were retained at this temperature for different periods varying from five seconds to two hours but no separation occured in any of the tests. However, when a sample so frozen was transferred without thawing to a temperature within the range of from about —15° to —100° C. separation did occur on thawing. If the sample was returned to the liquid air bath after exposure to temperatures within the range of —15° to —100° C. separation still occurred on thawing.

A similar phenomenon was noted with other modifiers, particularly HCl. This peculiar phenomenon appears to occur only within a rather narrow range of pH values close to the point at which the silica sols show maximum stability.

*Example 10*

A sol containing 5% SiO$_2$ at a pH of 10.0 was prepared by neutralizing "S" silicate of soda with HCl solution. When a small quantity of this was frozen in a beaker at —10° C. so that it froze within about one hour, a satisfactory soft amorphous product was obtained. However when a larger quantity in a pan was placed in a room at —20° C., it was not frozen completely in two hours and the product was unsatisfactory. It was hard and coarse and of large particle size.

In a similar test a 5% SiO$_2$ sol at pH 11.5 was prepared from "N" silicate of soda by the addition of HCl. When a pan of this sol was frozen at —20° C. it took three or four hours to freeze completely and did not gel in this time. The product was hard and coarse and unsatisfactory.

When however this same mixture was passed in the form of a fine spray into a bath of kerosene at a temperature of —10° to —30° C., the stream froze within less than one minute after entering the bath and probably within a rather small fraction of a second. The product recovered from this test by thawing, washing, and drying was very good.

Nearly instantaneous freezing was obtained by allowing a silica sol at a pH of 9.5 and containing 2.5% SiO$_2$, formed by modifying "N" silicate of soda with 1 N sulfuric acid, to fall dropwise into a test tube precooled to, and held in a bath at, the temperature of liquid air (—193° C). The silica separated completely on thawing. Unmodified "N" silicate of soda at the same concentration did not separate on thawing.

*Example 11*

An "N" silicate of soda solution was passed through a bed of a wet organic hydrogen exchange resin Nalcite MX and the so modified solution was found to have a pH of about 11.0. When this solution was frozen completely in less than one minute after freezing commenced and thawed, substantially all the silica present was recovered as an insoluble precipitate.

*Example 12*

"N" silicate of soda solution was diluted 256 fold to give a solution containing 0.15% SiO$_2$. This was modified by passing it through a bed of Amberlite IR–100H resin and then aged seventy minutes. This solution was then diluted 300 fold to produce a concentration of about 5 P. P. M. SiO$_2$. The diluted solution had a pH of 5.5. It was frozen fifteen minutes at minus 10 C. and after thawing, it was found that the SiO$_2$ had precipitated completely, as judged by the optical density.

*Example 13*

A modified sodium silicate solution containing 4.7% SiO$_2$ was prepared using Amberlite IR-100H resin as a modifying agent. It had a pH of 10.7. After freezing it was found that 79 per cent redispersed on thawing. The mother liquor was again passed through the exchange resin and the effluent was found to have a concentration of 3.7% $SiO_2$ with a pH of 9.85. 97.5 per cent of the silica present separated after freezing and thawing.

*Example 14*

A modified solution was prepared by diluting "N" sodium silicate 16 fold and passing this stock through an eight inch column of Amberlite IR-100H resin. The pH was brought to 8.5 by addition of an equal volume of the dilute stock solution. The product filtered off after freezing the sol completely within a few minutes as described, thawing and drying at room temperature had the following properties as shown by a control laboratory report.

Water content about 20%.
Particle size (microscope), 10 microns (average).
Adsorptivity:
  Petroleum, 4.0 gms./gm. $SiO_2$.
  Kerosene, 2.4 gms./gm. $SiO_2$.
Bulk density:
  Untamped, 3.8 #/ft.$^3$.
  Tamped, 5.6 #/%ft.$^3$.
Hardness, 0.04 gm. zinc/gm. $SiO_2$/min.
Characteristics of particles under microscope:
  Transparent flakes with sharply defined edges. Very easily broken into smaller similar pieces. A small amount of grinding would probably reduce particle size greatly.

*Example 15*

In this example commercial "N" sodium silicate, having an $SiO_2$ concentration of about 28.7 per cent by weight, was diluted with two volumes of water and frozen by adding solid carbon dioxide thereto in amount sufficient to produce partial neutralization. The carbon dioxide produced a simultaneous alteration of the pH of the silicate to within the metastable region and the freezing action. It was impossible, of course, to determine what pH was reached in this experiment. But when the frozen mass was thawed it was found that substantially the entire $SiO_2$ content of the silicate was present as a precipitate. This method is widely applicable to produce the freezing of commercial silicates in various dilutions. For example, solutions of "N" diluted in the ratios of 1:4 and 1:16 were frozen and when thawed the $SiO_2$ separated completely as a precipitate. It is obvious that complete congelation occurs within a few seconds after the solution is modified.

*Example 16*

One part of "N" of Example 1 was diluted with three parts of water and electrolyzed using a mercury cathode and lead anode at a current density of about 4 amperes per square decimeter of anode surface. In this process the sodium is replaced by the hydrogen of the water as completely as desired. In this case a sol at pH 9 was prepared and the $SiO_2$ was separated irreversibly by freezing.

*Example 17*

A sol prepared by treating diluted "N" with Nalcite MX had a pH of 11 and contained 9% $SiO_2$. It was carefully concentrated by evaporation at reduced pressure of 50 mm. of Hg until more than 25% $SiO_2$ was present. The $SiO_2$ was separated irreversibly by freezing completely in less than one minute after congelation had started in a given portion.

*Example 18*

In another series of experiments the refractive indices were determined for a number of $SiO_2$ products obtained by rapidly freezing sodium silicate solutions which had been modified to produce the $SiO_2$ concentrations and pH values indicated in the following table.

| Per Cent $SiO_2$ | pH | Modifier Employed | Ref. Index |
|---|---|---|---|
| 2.3 | 10.4 | Amberlite | 1.444 |
| 2.3 | 8.5 | ----do---- | 1.445 |
| 1.2 | 9.9 | ----do---- | 1.445 |
| 10 | 12.4 | ----do---- | 1.430 |
| 2.3 | 10.1 | $H_2SO_5$ | 1.440 |
| 2.3 | 9.3 | ----do---- | 1.455 |
| 1.2 | 2.4 | ----do---- | 1.430 |
| 1.2 | 8.8 | ----do---- | 1.438 |
| 1.2 | 10.1 | ----do---- | 1.442 |
| 2.3 | 2.0 | ----do---- | 1.460 |

The products of this invention, as a result of their unique properties, have many uses. Owing to the high friability of the $SiO_2$ particles it is possible by a short grinding operation to reduce the product to the form of an impalpable powder containing particles of colloidal dimensions. This can be accomplished by milling the product with paint vehicles, rubber mixtures etc. Its low water content and substantial freedom from other inorganic or organic compounds makes the product particularly useful in rubber compounding and adsorption problems. Its pH renders the product inert towards rubber accelerating and vulcanizing agents etc. Its refractive index enables it to be incorporated as a filler or extender in cellulose acetate and vinyl plastics to produce transparent articles. It can be used as a pigment, either colored or uncolored in paints. It is an ideal flatting agent in paints, lacquers, varnishes and other protective coatings and, owing to its flake-like particles, it has a high covering power and protective action. Its flaky nature also makes it applicable as a dry lubricant and in anti-misting mixtures. Owing to its softness it is ideal for modifying printing inks, cosmetics, dentifrices etc. It can be used as a selective adsorbent for recovering and purifying gases, liquids and various chemicals. It is an ideal extender for dusting powders in general, for example in insecticide dusts. It also can be used as an insulating medium, a ceramic additive and the like. The product can be readily suspended in liquids and the particles have a strong charge controlled by the pH of the suspensions. This means that the suspended particles can be used as adsorbents for dyes and other colloidal particles which are oppositely charged. Many other uses for the product will be evident from the above description.

The above description covers what are believed to be the most advantageous embodiments of the present invention. But it is obvious, of course, that many modifications can be made in the specific procedures which have been described without departing from the purview of this invention. Thus, the silicate solutions used as raw materials in the process may be made by dissolving solid alkali metal silicates in water but it is usually more convenient to employ the silicate solutions which are commercially available. In either case the solutions employed contain the electrolytes which are normally present in commercial silicates. It is also believed to be important that, after these solutions are modified to produce sols, these sols contain micelles which vary all the way from substantially molecular size to particles large enough to produce gels. No procedures are employed which tend to eliminate either the larger or the smaller micelles.

In some cases it is advantageous to age the metastable sols until they reach the state of incipient gel formation and then to freeze them rapidly but in most cases it is possible to modify the starting solutions in such manner that relatively stable sols are produced. If the solutions which are frozen are substantially free from heavy metal impurities the silica recovered is remarkably pure and can be freed from electrolytes derived from the mother liquor by simple washing operations. As indicated in the preceding description, the properties of the product obtained can be varied to a considerable extent by change in concentration and pH of the modified solutions which are subjected to the freezing step; also by change in the temperature used in the freezing step. Any temperature below the freezing point of the starting solution can be used provided that the concentration of silica and the volume of modified solution are so regulated that freezing is sufficiently rapid to avoid formation of a coarse product. It is important in my process to complete the congelation within one hour after it has commenced and it is preferred to complete the freezing of each increment within about ten minutes, or even within less than one minute at higher concentrations of silica, after congelation has commenced. It is usually preferred to employ temperatures within the range of about $-5°$ to $-50°$ C. below the freezing point, since these are more economical, but the use of lower temperatures tends to increase the recovery of the $SiO_2$ product. Of course it is recognized that in the peculiar region of sol stability in the neighborhood of pH 3 a complex of factors including temperature, concentration, pH, modifier, aging, etc. must be correctly balanced. It is evident, of course, that if too much acid is added or if the pH produced by contacting the starting solution with a hydrogen zeolite is too low, the pH can be raised to the desired point by the addition of a suitable amount of alkali or of unmodified solution.

In some cases it has been found advantageous to change the pH of the melt produced during the thawing step as soon as it is formed to a value that there is no tendency for the precipitated oxide to be redissolved in the mother liquor. This can be done readily by adding an acid to the frozen mass or to the wash water which is used in melting it. For example, $SiO_2$ precipitates produced at pH values in the neighborhood of twelve or above can be stabilized to some extent by the addition of an acid to the frozen mass or to the wash water.

While the process has been described particularly in connection with sodium silicate solutions it is equally applicable to solutions of the silicates of potassium and other alkali metals. The ratio of alkali metal oxide to $SiO_2$ of the starting solution has but little effect on the process, which means that all commercial silicates can be employed in the process. Other modifications of the present invention which fall within the scope of the following claims will be immediately evident to those skilled in this art.

What is claimed is:

1. In the production of finely divided amorphous $SiO_2$, the process which comprises diluting and lowering the pH of a commercial alkali metal silicate solution to a value within the range of from 1 to 12 to produce a silica sol tending to gel upon standing and having a concentration of $SiO_2$ within the range of from 2 to 30 per cent by weight, completely freezing said silica sol before gelation takes place and within a time period of not substantially over an hour, thawing and recovering the resulting finely divided precipitate of $SiO_2$; the said silica sol having a ratio of $SiO_2$ to the alkali metal oxide, which is free to combine therewith, of at least 5 to 1 and containing the electrolytes originally present in said commercial silicate solution as well as those formed in lowering the pH.

2. The process of claim 1 wherein the pH of said solution is lowered by the addition of an acid-reacting material to said alkali metal silicate solution.

3. The process of claim 1 wherein the pH of said solution is altered by passing it in contact with a bed of base exchanging material operating in the hydrogen cycle.

4. The process of claim 1 wherein the pH of said solution is lowered by electrolysis.

5. The process of claim 1 wherein said silica sol is frozen at temperatures within the range of about $-5°$ C. to $-50°$ C.

6. In the production of finely divided amorphous $SiO_2$ the process which comprises diluting a commercial sodium silicate solution to a concentration within the range of about 2 to 20 per cent $SiO_2$ by weight, adding an acid material to bring the pH within the range of about 1 to 12, and to produce a condition wherein the mixture tends to gel upon standing, freezing said mixture within less than one hour at temperatures within the range of about $-5°$ C. to $-50°$ C. and before gel formation takes place, thawing and recovering the resulting precipitate of $SiO_2$; said mixture having a ratio of $SiO_2$ to the alkali metal oxide, which is free to combine therewith, of at least 5 to 1, and containing the electrolytes originally present in said commercial silicate solution as well as those formed by the addition of said acid material.

7. The process of claim 6 wherein said mixture is aged prior to said thawing step to reduce the tendency of said percipitate to redisperse.

8. In the production of finely divided amorphous $SiO_2$, the process which comprises diluting a commercial sodium silicate solution to a concentration within the range of about 2 to 20 per cent $SiO_2$ by weight, passing the diluted solution through a bed of a base exchanging material operating in the hydrogen cycle, to produce a silica sol tending to gel upon standing; the said silica sol having a ratio of $SiO_2$ to the alkali metal oxide, which is free to combine therewith, of at least 5 to 1, and containing all electrolytes originally present in said commercial silicate solution not removed or contributed by said base exchanging material; freezing said sol within less than one hour at temperatures within the range of about $-5°$ C. to $-50°$ C. and before gel formation takes place, thawing and recovering the resulting precipitate of $SiO_2$.

9. The process of claim 8 wherein the solution of sodium silicate is aged after it has passed through the base exchanging material and before the freezing step.

JAMES FREDERIC HAZEL.

(References on following page)

REFERENCES CITED

The following references are of record in the file of this patent:

UNITED STATES PATENTS

| Number | Name | Date |
|---|---|---|
| 1,077,950 | Arsem | Nov. 4, 1913 |
| 1,270,093 | Arsem et al. | June 18, 1918 |
| 1,297,724 | Patrick | Mar. 18, 1919 |
| 1,504,549 | Govers | Aug. 12, 1924 |
| 1,506,118 | Govers | Aug. 26, 1924 |
| 1,665,264 | Holmes et al. | Apr. 10, 1928 |
| 1,762,228 | Holmes | June 10, 1930 |
| 1,813,272 | Biltz | July 7, 1931 |
| 1,819,356 | Church | Aug. 18, 1931 |
| 1,843,576 | McClure | Feb. 2, 1932 |
| 1,949,360 | Schorger | Feb. 27, 1934 |
| 2,092,163 | Johnson | Sept. 7, 1937 |
| 2,114,123 | Heuser | Apr. 12, 1938 |
| 2,278,746 | Sturgeon | Apr. 7, 1942 |
| 2,315,024 | Sturgeon | Mar. 30, 1943 |
| 2,384,505 | Thomas et al. | Sept. 11, 1945 |
| 2,396,758 | Stratford | Mar. 19, 1946 |
| 2,410,111 | Thomas et al. | Oct. 29, 1946 |

FOREIGN PATENTS

| Number | Country | Date |
|---|---|---|
| 459,058 | Great Britain | Jan. 1, 1937 |

OTHER REFERENCES

Kuhn, Journal fur prakt. Chem., ser. 1, vol. 59, pages 1–6 at page 5 (1853).

Freundlich, Colloid and Capillary Chemistry, translated from 3rd German edition by Hatfield, pages 475–6 and 582, pub. by E. P. Dutton & Co., N. Y.

Vanzetti, Chemical Abstracts, vol. 13. pages 1663–4 (pub. 1919).

Uno, Chemical Abstracts, vol. 34, page 7699 (1940).

Certificate of Correction

Patent No. 2,561,304                               July 17, 1951

JAMES FREDERIC HAZEL

It is hereby certified that error appears in the printed specification of the above numbered patent requiring correction as follows:

Column 3, line 53, for "miscelles" read *micelles*; column 6, line 26, for "region of" read *region is*; column 7, line 33, for "operatve" read *operative*; column 11, line 39, for "irresversible" read *irreversible*; column 12, line 69, for "10 C." read *10° C.*; column 14, in the table, column 3, line 6 thereof, for "$H_2SO_5$" read $H_2SO_4$;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*